(12) United States Patent
Messing et al.

(10) Patent No.: US 7,799,267 B2
(45) Date of Patent: Sep. 21, 2010

(54) METHOD FOR MANUFACTURE OF TRANSPARENT CERAMICS

(75) Inventors: Gary L. Messing, State College, PA (US); Elizabeth R. Kupp, Centre Hall, PA (US); Sang-Ho Lee, State College, PA (US); Garnia Y. Juwondo, State College, PA (US); Adam J. Stevenson, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 139 days.

(21) Appl. No.: 12/283,610

(22) Filed: Sep. 11, 2008

(65) Prior Publication Data

US 2009/0108507 A1   Apr. 30, 2009

Related U.S. Application Data

(60) Provisional application No. 60/993,744, filed on Sep. 14, 2007.

(51) Int. Cl.
*B28B 1/00* (2006.01)
(52) U.S. Cl. .................. 264/650; 501/152; 501/153
(58) Field of Classification Search .............. 264/650; 501/152, 153
See application file for complete search history.

(56) References Cited

U.S. PATENT DOCUMENTS

| | | | |
|---|---|---|---|
| 4,847,221 A * | 7/1989 | Horiguchi et al. | 501/98.4 |
| 5,378,665 A | 1/1995 | Chen et al. | |
| 5,484,750 A | 1/1996 | Greskovich et al. | |
| 5,672,554 A * | 9/1997 | Mohri et al. | 501/127 |
| 5,695,828 A | 12/1997 | Ghosh et al. | |
| 6,496,250 B1 | 12/2002 | Duclos et al. | |
| 6,817,550 B2 | 11/2004 | Taylor et al. | |
| 6,830,463 B2 | 12/2004 | Keller | |
| 6,844,285 B1 | 1/2005 | Wei | |
| 6,887,569 B1 | 5/2005 | Kriven et al. | |
| 6,967,330 B1 * | 11/2005 | Lempicki et al. | 250/361 R |
| 7,022,262 B2 | 4/2006 | Lee et al. | |
| 7,022,636 B2 | 4/2006 | Hamada et al. | |
| 7,172,142 B2 | 2/2007 | Taylor et al. | |
| 7,396,501 B2 | 7/2008 | Pope et al. | |
| 7,396,505 B2 | 7/2008 | Pope et al. | |
| 2006/0100088 A1 | 5/2006 | Loureiro et al. | |
| 2010/0048378 A1 * | 2/2010 | Tang et al. | 501/133 |

* cited by examiner

*Primary Examiner*—Steven P Griffin
*Assistant Examiner*—Russell J Kemmerle, III
(74) *Attorney, Agent, or Firm*—Law Offices of John A. Parrish

(57) ABSTRACT

The disclosed invention relates to a method of manufacture of transparent ceramics such as yttrium aluminum garnet by tape casting. The method entails forming a mixture of ceramic oxide, dispersant and organic solvent, milling the mixture to produce a first slurry, mixing the first slurry with an organic binder and a plasticizer to form a treated slurry, milling the treated slurry to produce milled slurry, tape casting the milled slurry to produce cast tape, drying the cast tape to produce dried tape, stacking portions of dried tape to form an assembly, compressing the assembly to produce a preform, heating the preform to produce a green preform, and sintering the green preform to produce transparent yttrium aluminum garnet. The method may be used to produce a unitary ceramic product having differing transparent sections as well as transparent ceramic product having a dopant gradient across a portion of the thickness of the product.

19 Claims, 4 Drawing Sheets

METHOD FOR MANUFACTURE OF TRANSPARENT CERAMICS

REFERENCE TO RELATED APPLICATIONS

This application claims priority to U.S. Provisional Application Ser. No. 60/993,744 filed Sep. 14, 2007.

FIELD OF THE INVENTION

The invention relates to transparent ceramics. In particular, this invention relates to manufacture of transparent ceramics such as but not limited to transparent yttrium aluminum garnet ("YAG").

BACKGROUND OF THE INVENTION

Transparent ceramics are useful as optical materials in applications such as host crystals in solid-state lasers, transparent armor, as well in IR windows and domes. YAG, due to its high thermal conductivity, strong crystal fields, and optical transmission over a broad spectral range is an excellent material for these applications.

Prior art methods for manufacture of transparent YAG typically employ processes such as dry pressing and slip casting. In these methods, yttria and alumina powders first are combined in a mill with an organic liquid such as ethanol to make a slurry. Alternatively, YAG powder may be substituted for the yttria and alumina powders. Additives such as dopants, sintering aids, dispersants, surfactants, binders and/or pressing aids may be included in the slurry. For slip casting, the slurry is milled to intimately mix the solids and the organics. The resulting milled slurry then is poured into a slip-casting mold to yield a component formed of the ceramic powder and the organics. For dry pressing, the slurry is dried, crushed, sieved and pressed uniaxially and/or isostatically. The component is heat treated to remove organics and yield a green preform. The green preform then is sintered or hot pressed.

These prior art methods have been used to produce YAG materials that have high transparencies. These methods, however, suffer various disadvantages such as not being able to produce sheets of material that can be formed into thin transparent plates. These methods also suffer from difficulty in forming a compositional gradient of dopant through the sintered, transparent component.

A need therefore exists for a method of manufacture of transparent ceramics such as transparent YAG that avoids the disadvantages of the prior art.

BRIEF DESCRIPTION OF THE DRAWINGS

FIG. 6 (b) is a perspective view of a co-cast tape made according to example 13A.

SUMMARY OF THE INVENTION

Figure 1:
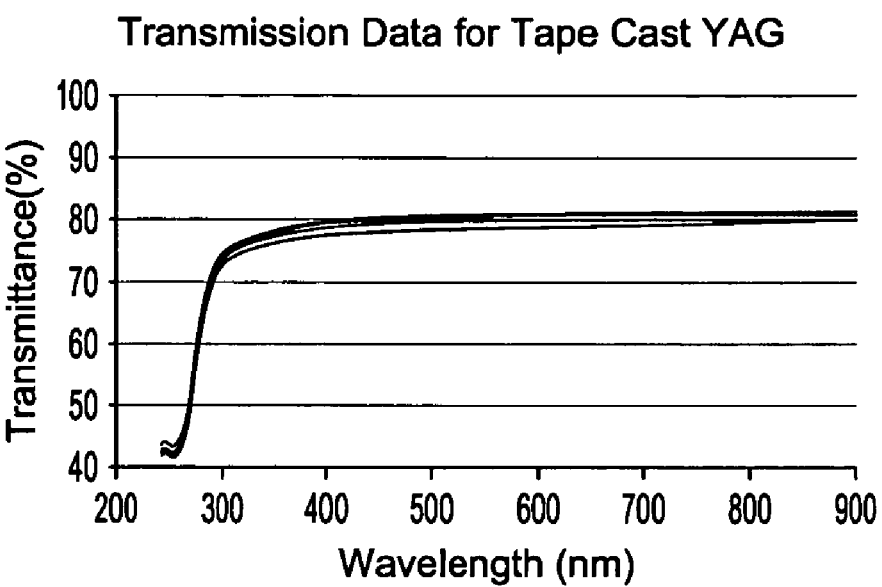
FIG. 1 shows transmission data over the spectral range of 250 nm to 900 nm of a 2.7 mm thick, transparent undoped YAG sample made according to Example 1.
Figure 2:
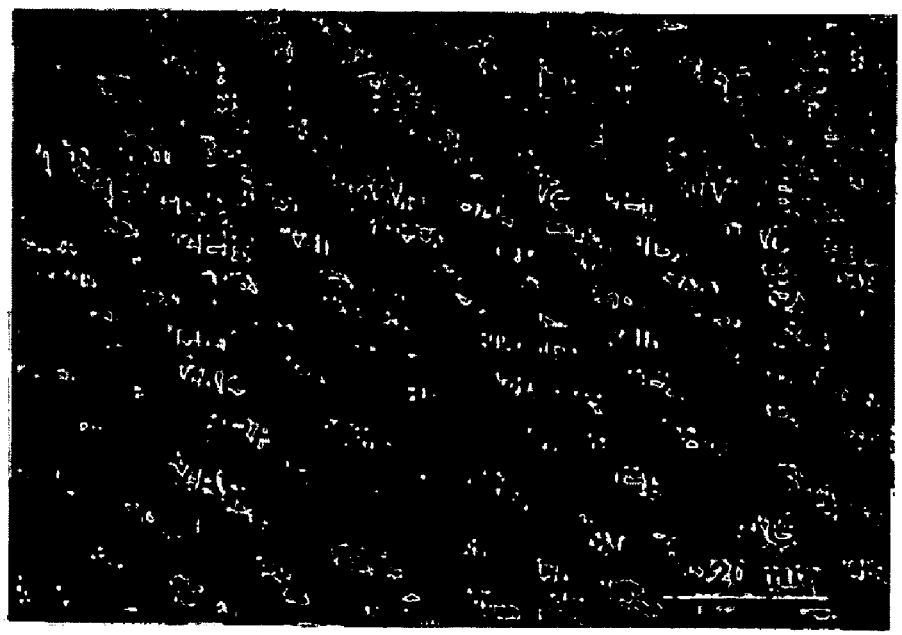
FIG. 2 is a photograph of 3.2 mm thick, transparent 0.5 at % Er doped YAG sample made according to Example 12.

The method generally entails tape casting a slurry of one or more ceramic compounds such as but not limited to oxides of any one or more of yttrium oxide, aluminum oxide, indium oxide, thallium oxide, scandium oxide, lutetium oxide, cerium oxide, magnesium aluminum spinel, YAG, zirconium oxide, silicon aluminum oxi-nitride and mixtures thereof, preferably mixtures of yttrium oxide and aluminum oxide.

The resulting tape cast parts then may be sintered in vacuum, air, oxygen, hydrogen or a noble gas such as but not limited to helium (He), neon (Ne), argon (Ar), krypton (Kr), xenon (Xe), radon (Rn) and mixtures thereof to produce sintered, transparent products. The sintered products may be further densified by hot isostatic pressing to achieve products that are close to theoretical density. As used herein, the term "close to theoretical density" is understood to mean 99.999% or more of theoretical density. The tape cast parts also may be isostatically hot pressed in vacuum, air, oxygen, hydrogen or an inert gas to produce transparent products.

In a first aspect, the invention provides a method for manufacture of transparent ceramics such as but not limited to transparent oxides such as yttrium oxide, scandium oxide, lutetium oxide, cerium oxide, indium oxide, thallium oxide, magnesium aluminum spinel, YAG and mixtures thereof from tapes produced by tape casting of ceramic slurries. The tapes may be sintered to produce thin, transparent ceramics such as but not limited to YAG in the form of sheets and plates. Alternatively, the tapes may be sintered and hot isostatically pressed (HIPed) to produce transparent ceramic products such as but not limited to transparent YAG.

In a second aspect, the invention provides a method for manufacture of compositionally segmented tapes and products formed from those segmented tapes. The slurries used in tape casting to produce transparent products such as but not limited to transparent ceramics such as but not limited to YAG may be prepared by adding dried oxide powder to a blend of one or more dispersants and one or more solvents, as well optional additives such as but not limited to one or more dopants and one or more sintering aids, to a milling device such as but not limited to a ball mill jar to produce a mixture. Useful dried oxide powders include but are not limited to those prepared by heating in air at about 100° C. to remove adsorbed moisture. The mixture then is milled to produce a first slurry. One or more plasticizers and one or more binders then may be added to the first slurry and further milled to produce a milled slurry. Where dopants are employed, the dopants may be added to the mixture prior to the milling step used to produce the first slurry. Alternatively, the dopants may be added to the first slurry before it is further milled to produce the milled slurry. A homogenizer such as but not limited to a ketone such as but not limited to methyl ethyl ketone, methylisobutylketone, diisobutylketone, polyether ether ketone, cyclohexanone, acetone, propanone or mixtures thereof optionally may be added to the milled slurry.

The milled slurry is stirred to remove entrapped air and to evaporate solvent to produce a de-aired slurry of a desired viscosity, typically about 50 centipoise to about 5,000 centipoise, preferably about 100 centipoise to about 1000 centipoise, more preferably about 100 centipoise to about 400 centipoise. The de-aired slurry is cast by a doctor blade onto a moving carrier to produce a cast tape.

The doctor blade gap and carrier speed may be varied to achieve a desired thickness of the cast tape. The doctor blade gap may vary from about 0.2 mm to about 0.5 mm, preferably about 0.25 mm to about 0.4 mm, more preferably about 0.3 mm to about 0.35 mm. The carrier speed may vary from about 20 cm/min to about 50 cm/min, preferably about 30 cm/min to about 40 cm/min, more preferably about 35 cm/min to about 40 cm/min. The cast tape then is dried to produce a dried tape that is cut into pieces of a desired configuration. Typically, the tape is dried to a solvent content of less than about 0.25 wt. % to about 5 wt. %, preferably about 0.25 wt. % to about 3 wt. %, more preferably about 0.25 wt. % to about 1 wt. % based on the weight of the dried tape.

A number of the pieces, typically about 2 pieces to about 200 pieces, preferably about 10 pieces to about 100 pieces, more preferably about 30 pieces to about 60 pieces may be stacked to form an assembly. These numbers are highly variable and dependent on the dried tape thickness and desired part thickness. The pieces used to form the assembly may contain different amounts of dopant where it is desired to produce a transparent product that has a dopant gradient across the thickness of the product.

The assembly is laminated under pressure, such as but not limited to uniaxial and/or isostatic pressure at temperatures above the glass transition temperature of the binder system employed to yield a preform that then is heated to burn-out organics to produce a green preform. The green preform then may fired in atmospheres such as but not limited to air, overpressure of oxygen, vacuum, hydrogen, nitrogen, or a noble gas such as but not limited to helium (He), neon (Ne), argon (Ar), krypton (Kr), xenon (Xe), radon (Rn) and mixtures thereof, to produce a sintered, transparent ceramic product that has a porosity of less than about 0.1%, preferably less than about 0.01% to less than about 0.05%, more preferably less than about 0.001% to less than about 0.0015%. The sintered ceramic may be further densified such as by hot isostatic pressing.

Where YAG products such as but not limited to transparent YAG products are being produced, the transparent YAG products typically have optical transparencies about equal to that of YAG single crystal such as over the entire spectral range, preferably over the range of about 300 nanometers to about 1700 nanometers. Where transparent YAG products are produced, the products may be undoped YAG as well as doped YAG, such as but not limited to YAG doped with rare earth dopants such as but not limited to Ce, Dy, Er, Eu, Gd, Ho, La, Lu, Nd, Pm, Pr, Sm, Tb, Tm, Yb and mixtures thereof. The concentration of rare earth dopant in the YAG products may be uniform or may vary according to a desired gradient across any dimension of the product.

Where YAG products such as but not limited to transparent YAG products are being produced, they may be prepared by adding dried yttria powder and dried alumina powder, such as but not limited to oven dried yttria powder and oven dried alumina powder to a blend of dispersant and one or more solvents, as well optional additives such as but not limited to dopants and sintering aids, to a ball mill jar to produce a mixture. Useful powders include but are not limited to those prepared by heating in air at about 100° C. to remove adsorbed moisture. The mixture then is milled such as by ball milling to produce a first slurry. One or more plasticizers and one or more binders then may be added to the first slurry and further milled to produce a milled slurry. Dopants that may be employed include but are not limited to rare earth dopants such as but not limited to $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$ $Er^{3+}$, $Tm^{3+}$ $Yb^{3+}$, $Lu^{3+}$ and mixtures thereof. One or more dopants may be added to the mixture prior to the milling step used to produce the first slurry. Alternatively, one or more dopants may be added to the first slurry before it is further milled to produce the milled slurry. One or more homogenizers such as but not limited to acetone, propanone, a ketone such cyclohexanone as well as mixtures optionally may be added to the milled slurry. The milled slurry is stirred to remove entrapped air and to evaporate excess solvent to achieve a de-aired slurry of a desired viscosity. The viscosity of the de-aired slurry may vary from about 50 centipoise to about 5000 centipoise, preferably about 100 centipoise to about 1000 centipoise, more preferably about 100 centipoise to about 400 centipoise.

Where transparent YAG is being produced, the de-aired slurry is cast by a doctor blade onto a moving carrier to produce a cast tape. The doctor blade gap may vary from about 0.2 mm to about 0.5 mm, preferably about 0.25 mm to about 0.4 mm, more preferably about 0.3 mm to about 0.35 mm. The carrier speed may be varied to achieve a desired thickness of the cast tape. The carrier speed may vary from about 20 cm/min to about 50 cm/min, preferably about 30 cm/min to about 40 cm/min, more preferably about 35 cm/min to about 39 cm/min.

Where transparent YAG is being produced, the cast tape is dried and cut into a number of pieces of a desired configuration. A number of the pieces, typically about 2 pieces to about 200 pieces, preferably about 10 pieces to about 100 pieces, more preferably about 30 pieces to about 60 pieces are stacked to form an assembly.

Where it is desired to have a dopant gradient across the thickness of the sintered YAG product, various pieces that have different amounts of dopant may be used to form the assembly. The assembly is laminated under pressure, such as but not limited to uniaxial and/or isostatic pressure at temperatures above the glass transition temperature of the binder system employed to yield the preform. The preform then is heated in air at about 0.1° C./min to about 2° C./min, preferably about 0.1° C./min to about 1° C./min, more preferably about 0.1° C./min to about 0.4° C./min with optional holds at any one or more of 190° C., 275° C., 375° C. and 500° C. for about 15 min to about 240 min each, to burn-out organics to produce a green preform. The green preform then may heated at a constant rate of about 2° C./min to about 40° C./min, preferably about 5° C./min to about 20° C./min, more preferably about 5° C./min to about 10° C./min to a sintering temperature of about 1600° C. to about 1900° C., preferably about 1800° C. to about 1900° C., more preferably about 1800° C. to about 1850° C. with hold times of about 15 min to about 48 hrs, preferably about 30 min to about 20 hrs, more preferably about 4 hrs to about 8 hrs at the sintering temperature. Alternatively, the green preform may be heated at a variable rate of about 2° C./min to about 40° C./min, preferably about 5° C./min to about 20° C./min, more preferably about 5° C./min to about 10° C./min to a sintering temperature of about 1600° C. to about 1900° C., preferably about 1800° C. to about 1900° C., more preferably about 1800° C. to about 1850° C. with hold times of about 15 min to about 48 hrs, preferably about 30 min to about 20 hrs, at the sintering temperature. In addition, one or more holds of about 30 min to about 8 hr, preferably about 1 hr to about 8 hr, more preferably about 2 hr to about 4 hr at intermediate temperatures of about 1200° C. to about 1700° C., preferably about 1200° C. to about 1500° C., more preferably about 1300° C. to about 1400° C. may be employed during sintering.

Atmospheres which may be employed during sintering include, such as but not limited to, air, overpressure of oxygen, vacuum, hydrogen, nitrogen, or noble gas atmosphere such as but not limited to any of helium (He), neon (Ne), argon (Ar), krypton (Kr), xenon (Xe), radon (Rn) and mixtures thereof or mixtures thereof, to produce a sintered, transparent ceramic product, such as but not limited to sintered, transparent YAG that typically has a porosity of less than about 0.1%, preferably less than about 0.01%, more preferably less than about 0.001%.

Upon completion of sintering, cooling to room temperature may be performed at a constant cooling rate of about 2° C./min to about 40° C./min, preferably about 10° C./min to about 40° C./min, more preferably about 20° C./min to about 40° C./min. Cooling also may be done at a variable cooling rate of about 2° C./min to about 40° C./min, preferably about 10° C./min to about 40° C./min, more preferably about 20° C./min to about 40° C./min.

The sintered YAG may be further densified, such as by hot isostatic pressing, at about 1500° C. to about 1900° C., preferably about 1600° C. to about 1900° C., more preferably about 1675° C. to about 1750° C. at about 25 MPa to about 400 MPa, preferably about 50 MPa to about 400 MPa, more preferably about 200 MPa to about 400 MPa for about 30 min to about 12 hrs, preferably about 1 hr to about 8 hr, more preferably about 2 hr to about 8 hr.

In one aspect, manufacture of transparent yttrium aluminum garnet entails forming a mixture of $Y_2O_3$, $Al_2O_3$, sintering aid, dispersant and organic solvent, milling the mixture to produce a first slurry, mixing the first slurry with an organic binder and a plasticizer to form a treated slurry, milling the treated slurry to produce milled slurry, tape casting the milled slurry to produce cast tape, drying the cast tape to produce dried tape, stacking portions of dried tape to form an assembly, compressing the assembly to produce a preform, heating the preform to produce a green preform, and sintering the green preform to produce transparent yttrium aluminum garnet.

In another aspect, the invention relates to a method of forming transparent ceramic oxide materials from a mixture of ceramic oxide, dispersant and organic solvent, milling the mixture to produce a first slurry, mixing the first slurry with an organic binder and a plasticizer to form a treated slurry, milling the treated slurry to produce milled slurry, tape casting the milled slurry to produce cast tape, drying the cast tape to produce dried tape, stacking portions of dried tape to form an assembly, compressing the assembly to produce a preform, heating the preform to produce a green preform, and sintering the preform to produce transparent ceramic oxide.

In a further aspect, the invention relates to a method of forming a transparent ceramic segmented tape. The method entails forming a plurality of milled slurries of differing compositions wherein at least one of the milled slurries is made by forming a mixture of ceramic oxides, dispersant and solvent, milling the mixture to form a first slurry, mixing the first slurry with a binder and a plasticizer to form a treated slurry, milling the treated slurry to form a milled slurry, depositing the milled slurries into adjacent reservoirs within a doctor blade device suitable for simultaneously casting each of the milled slurries onto a carrier to form a plurality of tape cast segments having contiguous interfaces between the segments to produce a segmented cast tape, drying the cast tape to produce dried tape, stacking portions of dried tape to form an assembly, compressing the assembly to produce a preform, heating the preform to produce a green preform, and sintering the green preform to produce transparent ceramic segmented tape.

In yet another aspect, the invention relates to a method of forming a transparent ceramic product having a dopant gradient across a portion of the thickness of the product. The method entails forming a plurality of milled slurries of differing compositions wherein at least one of the milled slurries is made by forming a mixture of ceramic oxide, dopant, dispersant and solvent, milling the mixtures to form a plurality of first slurries, mixing at least one of the first slurries with a binder and a plasticizer to form treated slurries, milling the treated slurries to form milled slurries, tape casting the milled slurries to produce a plurality of cast tapes of differing compositions, drying the cast tapes to produce dried tapes of differing compositions, stacking portions of the dried tapes to form thicknesses of a plurality of assemblies of the dried tapes, compressing the assemblies to produce a preform, heating the preform to produce a green preform, and sintering the green preform to produce a transparent ceramic product having a thickness and a dopant gradient across a portion of the thickness of the ceramic product.

The invention is further described below by reference to the following detailed description and non-limiting examples.

DETAILED DESCRIPTION OF THE INVENTION

Definitions

As referred to herein, transparent is understood to mean transmissive up to about 95% of the theoretical transmission of the material to radiation including visible radiation over at least a portion of the spectral range of about 300 nanometers to about 5000 nanometers.

Tape Casting Slurry Materials for Manufacture of Transparent Ceramic Materials Such as Transparent YAG Ceramic Materials Typically, the ceramic powders such as but not limited to oxides that may be employed have a purity of about 99.99% to about 99.9999%, preferably about 99.995% pure to about 99.9999% pure, more preferably about 99.999% pure to about 99.9999% pure, and a particle size of about 50 nanometer to about 5000 nanometer, preferably about 100 nanometer to about 1000 nanometer, more preferably about 200 nanometer to about micron 400 nanometer.

Dispersants which may be employed include but are not limited to oxidized Menhaden fish oil, dicarboxylic acids such succinic acid, ethanedioic acid, propanedioic acid, pentanedioic acid, hexanedioic acid, heptanedioic acid, octanedioic acid, nonanedioic acid, decanedioic acid, o-phthalic acid, p-phthalic acid and mixtures thereof. Other dispersants that may be used include sorbitan monooleate, preferably oxidized Menhaden fish oil (MFO).

Solvents which may be used in manufacture of transparent ceramic materials such as but not limited to transparent YAG include but are not limited to water, a lower alkanol such as but not limited to denatured ethanol, methanol, isopropyl alcohol and mixtures thereof, preferably denatured ethanol, xylenes, cyclohexanone, acetone, toluene and methyl ethyl ketone, and mixtures thereof, preferably a mixture of xylenes and ethanol.

Sintering aids which may be used in manufacture of transparent ceramic materials such as but not limited to transparent YAG include silicas such as but not limited to tetraethoxysilane (TEOS), colloidal silica and mixtures thereof; oxides such as but not limited to lithium oxide, titanium oxide, zirconium oxide, barium oxide, calcium oxide, magnesium oxide, strontium oxide, boron oxide and mixtures thereof; preferably tetraethoxysilane (TEOS).

Dopants which may be used in manufacture of transparent ceramic materials such as but not limited to transparent YAG include rare earth dopants such as but not limited to $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$ $Er^{3+}$, $Tm^{3+}$ $Yb^{3+}$, $Lu^{3+}$ and mixtures thereof. The dopants may be used in the form of oxides such as but not limited to $La_2O_3$, $Ce_2O_3$, $Pr_2O_3$, $Nd_2O_3$, $Pm_2O_3$ $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, and mixtures thereof; hydroxides such as but not limited to $La(OH)_3 \cdot 6H_2O$, $Ce(OH)_3 \cdot 6H_2O$ $Pr(OH)_3 \cdot 6H_2O$, $Nd(OH)_3 \cdot 6H_2O$, $Pm(OH)_3 \cdot 6H_2O$, $Sm(OH)_3 \cdot 6H_2O$, $Eu(OH)_3 \cdot 6H_2O$, $Gd(OH)_3 \cdot 6H_2O$, $Tb(OH)_3 \cdot 6H_2O$, $Dy(OH)_3 \cdot 6H_2O$ $Ho(OH)_3 \cdot 6H_2O$, $Er(OH)_3 \cdot 6H_2O$, $Tm(OH)_3 \cdot 6H_2O$, $Yb(OH)_3 \cdot 6H_2O$, $Lu(OH)_3 \cdot 6H_2O$ and mixtures thereof and nitrates such as but not limited to $Nd(NO_3)_3$, $La(NO_3)_3$, $Ce(NO_3)_3$, $Pr(NO_3)_3$, $Nd(NO_3)_3$, $Pm(NO_3)_3$, $Sm(NO_3)_3$, $Eu(NO_3)_3$, $Gd(NO_3)_3$, $Ho(NO_3)_3$, $ErNO_3)_3$, $TmNO_3)_3$, $Yb(NO_3)_3$, $TbNO_3)_3$, $Dy(NO_3)_3$, $Lu(NO_3)_3$, as well as mixtures thereof.

Organic binders which may be employed in manufacture of transparent ceramic materials such as but not limited to transparent YAG include but are not limited to Vinyl polymers such as but not limited to polyvinyl butyral, polyvinyl alcohol (PVA), polyvinyl chloride (PVC), polyvinyl acetate (PVAc), polyacrylonitrile, mixtures thereof and copolymers thereof, polyethyleneimine, poly methyl methacrylate (PMMA), vinyl chloride-acetate and mixtures thereof, preferably PVB.

Plasticizers which may be employed in manufacture of transparent ceramic materials such as but not limited to transparent YAG include but are not limited to butyl benzyl phthalate, dicarboxylic/tricarboxylic ester-based plasticizers such as but not limited to phthalate-based plasticizers such as but not limited to bis(2-ethylhexyl) phthalate, diisononyl phthalate, bis(n-butyl)phthalate, butyl benzyl phthalate, diisodecyl phthalate, di-n-octyl phthalate, diisooctyl phthalate, diethyl phthalate, diisobutyl phthalate, di-n-hexyl phthalate and mixtures thereof; adipate-based plasticizers such as but not limited to bis(2-ethylhexyl)adipate, dimethyl adipate, monomethyl adipate, dioctyl adipate and mixtures thereof; sebacate-based plasticizers such as but not limited to dibutyl sebacate, and maleate type plasticizers such as but not limited to dibutyl maleate, diisobutyl maleate and mixtures thereof; polyalkylene glycols such as but not limited to polyethylene glycol, polypropylene glycol and mixtures thereof. Other plasticizers which may be used include but are not limited to benzoates, epoxidized vegetable oils, sulfonamides such as but not limited to N-ethyl toluene sulfonamide, N-(2-hydroxypropyl) benzene sulfonamide, N-(n-butyl)benzene sulfonamide, organophosphates such as but not limited to tricresyl phosphate, tributyl phosphate, glycols/polyethers such as but not limited to triethylene glycol dihexanoate, tetraethylene glycol diheptanoate and mixtures thereof; alkyl citrates such as but not limited to triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trimethyl citrate, alkyl sulphonic acid phenyl ester and mixtures thereof.

Preparation of Tape Casting Slurry and Manufacture of Cast Tape for Manufacture of Transparent Ceramic Materials Such as Transparent YAG One or more of the above mentioned dispersants or mixtures thereof such as but not limited to oxidized Menhaden fish oil are mixed with one or more of the above mentioned solvents or mixtures thereof such as but not limited to water, denatured ethyl alcohol and xylene, and added to a mill jar that has milling media therein. Useful milling media include but are not limited to ceramic materials such as but not limited to alumina, yttria-stabilized zirconia, YAG, and mixtures thereof.

The mill jar may be filled to about 15% volume capacity to about 50% volume capacity, preferably about 20% volume capacity to about 40% volume capacity, more preferably about 25% volume capacity to about 35% volume capacity with the milling media. A sintering aid such as but not limited to silica in the form of colloidal silica or tetraethoxysilane (TEOS), preferably tetraethoxysilane (TEOS), as well as one or more of the above mentioned dopants or mixtures thereof such as but not limited to $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$ $Er^{3+}$, $Tm^{3+}$ $Yb^{3+}$, $Lu^{3+}$ and mixtures thereof in the form of such as but not limited to oxide, hydroxide or nitrate, or a mixture thereof may be added together with the dried ceramic materials such as but not limited to alumina and yttria powders to the mill jar.

Sintering aids which may be employed in manufacture of transparent ceramic materials such as but not limited to transparent YAG may be employed over a wide range. Sintering aids may vary from about 0.01 wt. % to about 5 wt. %, preferably about 0.02 wt. % to about 2 wt. %, more preferably about 0.04 wt. % to about 1 wt. % based on the weight of the ceramic powder.

Dopants which may be employed in manufacture of transparent ceramic materials such as transparent YAG may be employed over a wide range. Dopants may vary from about 0.05 at. % to about 50 at. %, preferably about 0.1 at. % to about 10 at. %, more preferably about 0.25 at. % to about 4 at. % of the ceramic powder.

Solvents which may be employed in manufacture of transparent ceramic materials such as but not limited to transparent YAG may be employed over a wide range. Solvents may vary from about 20 wt. % to about 40 wt. %, preferably about 25 wt. % to about 35 wt. %, more preferably about 28 wt. % to about 32 wt. % based on the weight of the ceramic powder.

Dispersants which may be employed in manufacture of transparent ceramic materials such as but not limited to transparent YAG may be employed over a wide range. Dispersants may vary from about 0.1 wt. % to about 4 wt. %, preferably about 0.5 wt. % to about 2 wt. %, more preferably about 1 wt. % to about 1.5 wt. % based on the weight of the ceramic powder.

The mill jar loaded with milling media, ceramic powder, solvent, and dispersant, as well as optional sintering aids and dopants, is milled for about 4 hrs to about 36 hrs, preferably about 12 hrs to about 30 hrs, more preferably about 18 hrs to about 24 hrs to produce a first slurry.

A binder system that includes one or more of the above mentioned organic binders or mixtures thereof and one or more of the above mentioned plasticizers or mixtures thereof then may added to the first slurry. Binders which may be employed in manufacture of transparent ceramic materials such as but not limited to transparent YAG may be employed over a wide range. Binders may vary from about 0.5 wt. % to about 8 wt. %, preferably about 1 wt. % to about 4 wt. %, more preferably about 2.5 wt. % to about 3.5 wt. % based on the weight of the ceramic powder.

Plasticizers which may be employed in manufacture of transparent ceramic materials such as but not limited to transparent YAG may be employed over a wide range. Plasticizers may vary from about 0.5 wt. % to about 8 wt. %, preferably about 1 wt. % to about 4 wt. %, more about 2.5 wt. % to about 3.5 wt. % based on the weight of the ceramic powder.

One or more homogenizers such as but not limited to cyclohexanone optionally may be added to the first slurry. The amount of homogenizer which may be employed in manufacture of transparent ceramic materials such as but not limited to transparent YAG may vary from about 0.01 wt. % to about 0.4 wt. %, preferably about 0.1 wt. % to about 0.2 wt. %, more preferably about 0.12 wt. % to about 0.2 wt. % based on the weight of milled slurry. The slurry having the additions of binder, plasticizer and optional homogenizer then is milled for about 4 hrs to about 36 hrs, preferably about 12 hrs to about 24 hrs to about 30 hrs, more preferably about 18 hrs to about 24 hrs to produce a milled slurry. The milled slurry then is passed through a sieve to separate it from the milling media. The milled slurry then is stirred at room temperature for about 15 min to about 60 min, preferably about 20 min to about 45 min, more preferably about 20 min to about 30 min to remove entrapped air and to evaporate excess solvent to achieve a slurry viscosity suitable for tape casting. The slurry then is cast onto a moving carrier such as glass, a steel belt or a polymeric sheet such as but not limited to silicone-coated Mylar, polypropylene or polyester, preferably silicone-coated Mylar to produce a cast tape.

Suitable viscosities of the slurry which may be employed in manufacture of transparent ceramic materials such as but not limited to transparent YAG are about 50 centipoise to about 5000 centipoise, preferably about 100 centipoise to about 1000 centipoise, more preferably about 100 centipoise to about 400 centipoise depending on slurry composition, doctor blade geometry, desired tape thickness, carrier material and carrier speed. The cast tape which may be employed in manufacture of transparent ceramic materials such as but not limited to transparent YAG is dried at about 20° C. to about 40° C., preferably about 20° C. to about 27° C., more preferably 22° C. to about 25° C. to produce a dried tape.

In another aspect, two or more slurries of differing compositions which may be employed in manufacture of transparent ceramic materials such as but not limited to transparent YAG may be cast concurrently onto a moving carrier to produce a segmented tape. The slurries may be cast using device 1 shown in FIG. 5. Device 1 includes rear support 5, side supports 7 and dividers 10 attached to support 5. The number of dividers 10 may vary to produce a desired number of reservoirs between dividers 10 and sides 7. Doctor blade 15 slides into grooves in faces of sides 7. Support bar 17 has dials 19 which are operatively connected to blade 15 to vary the gap of doctor blade 15. Space is provided between adjacent dividers 10 form slurry reservoirs 20, each of which may include a slurry of a desired composition. In this aspect, device 1 may be used to co-cast two or more slurries onto a moving carrier to form a segmented tape which has two or more differing compositions which share a common interface(s) along the length of the tape. After the segmented tape is cast, the tape is cut into a desired number of co-cast pieces. Preferably, cutting is orthogonal to the length of the tape. Two or more of the co-cast pieces may be stacked to produce an assembly wherein segments formed from the same slurry preferably are in registry with each other. The assembly then may be compressed to produce a preform that may be dried and sintered.

Manufacture of Green Preform and Sintering to Yield Transparent Ceramics Such as but not Limited to Transparent YAG Typically, dried tape produced as above is cut into pieces such as plates of a desired size and shape. A wide number of pieces, typically about 2 to about 200 pieces, preferably about 10 pieces to about 100 pieces, more preferably about 30 pieces to about 60 pieces may be stacked to produce an assembly that is compressed to yield a preform. The pieces may be stacked relative to each other in any orientation, Preferably, the pieces are stacked with an orientation that alternates between 0° and 90°, such as 0°, 90°, 180° and 270°, etc. When co-cast pieces are stacked, the pieces preferably are stacked with 0° and 180° orientations relative to each other. The pieces preferably are stacked with the top face up or the bottom face up as between alternating layers. If a dopant gradient is desired in the sintered product, the dopant gradient may be introduced during stacking by assembling pieces cut from tapes that have differing dopant concentrations.

A uniaxial press that has platens heated to about the glass transition (i.e. softening) temperature of the organic mixture employed to form the tape may be used to compress the assembly to yield a preform. Alternatively, an isostatic press may be used. During isostatic pressing, pressure is transmitted to the assembly via a heated liquid such as but not limited to distilled water.

Where uniaxial pressing is employed, the assembly may be uniaxially pressed under pressure of about 5 MPa to about 30 MPa, preferably about 5 MPa to about 20 MPa, more preferably about 5 MPa to about 10 MPa to cause the pieces to bond to each other and then isostatically pressed at a pressure of about 10 MPa to about 30 MPa, preferably about 15 MPa to about 30 MPa, more preferably about 25 MPa to about 30 MPa to intimately bond the pieces into a preform. The preform then is heated in an oxidizing atmosphere such as air to burn out organics such as but not limited to dispersants, binders and plasticizers to produce a green preform. Heating is done at a rate and for a time sufficient to decompose the organics while minimizing evolution of gases. Generally, heating is performed at about 0.1 C/min to about 2° C./min, preferably about 0.1° C./min to about 1° C./min, more preferably about 0.1° C./min to about 0.4° C./min.

The green preform is sintered in any of vacuum, air, oxygen over-pressure, hydrogen, nitrogen or a noble gas such as but not limited to helium (He), neon (Ne), argon (Ar), krypton (Kr), xenon (Xe), radon (Rn) and mixtures thereof, preferably in a vacuum of about $10^{-1}$ Torr to about $10^{-6}$ Torr, more preferably in a vacuum of about $10^{-2}$ Torr to about $10^{-4}$ Torr to remove porosity and to yield optically transparent ceramic parts such as but not limited to optically transparent YAG parts, The sintered, transparent ceramic parts then may be cooled to room temperature at a rate sufficient to minimize diffusion of sintering aids from diffusing out to grain boundaries to possibly form second phases or films along the boundaries. Cooling rates may vary from about 10° C./min to about 50° C./min, preferably about 15° C./min to about 40° C./min, more preferably about 15° C./min to about 25° C./min.

Where transparent YAG is being produced with yttria and alumina powders, each of these powders may have a purity of about 99.99% to about 99.9999%, preferably about 99.995% to about 99.9999%, more preferably about 99.999% to about 99.9999%, and a particle size of about 50 nanometer to about 5000 nanometer, preferably about 100 nanometer to about 1000 nanometer, more preferably about 200 nanometer to about 400 nanometer.

The yttria and alumina powders are dried in air for 24 hrs or more at about 100° C. to remove adsorbed water prior to use. The powders may be stored in vacuum or inert atmosphere to prevent water adsorption prior to use. Examples of yttria powders that may be used include but are not limited to yttria powder from Nippon Yttria Company (NYC) (99.999% pure, 5000 nm diameter). Shin-Etsu UU yttria (300 nm, 99.99% pure), Shin-Etsu UU-HP yttria (200 nm, 99.99% pure). Alumina powders that may be used include but are not limited to alumina powder from Baikowski BA-15 (200 nm, 99.99% pure), Sumitomo AKP-3000 alumina (500 nm, 99.999% pure), and Sumitomo AKP-50 alumina (300 nm, 99.999% pure).

The amounts of yttria and alumina powders may vary. Typically, the amounts of yttria and alumina are employed in a molar ratio of yttria:alumina of about 2.5:5.5 to about 3.5:

4.5, preferably about 2.8:5.2 to about 3.2.4.8, more preferably about 2.95:5.05 to about 3.05:4.95, most preferably 3:5. The dried yttria and alumina powders may be added to the mill jar directly from the drying oven. Alternatively, the powders, after oven drying, may be stored in any of a vacuum or an inert atmosphere prior to use. Heating rates during sintering may vary from about 2° C./min to about 40° C./min, preferably about 5° C./min to about 10° C./min, with optional holds of about 15 min to about 48 hrs, preferably 30 min to about 8 hrs, more preferably about 2 hrs to about 4 hrs at temperatures where gases may be evolving and/or to allow phase transformation to go to completion. Sintering may be performed at about 1600° C. to about 1900° C., preferably about 1800° C. to about 1900° C., more preferably about 1800° C. to about 1850° C.

EXAMPLES

Example 1

Manufacture of YAG from Alumina and Yittria Powders

A 250 ml high density polyethylene mill jar is filled to 33.3% vol capacity with 5 mm diameter $Y_2O_3$-stabilized $ZrO_2$ milling media. Oxidized Menhaden fish oil (1.40 g, grade Z-3, Tape Casting Warehouse), xylene (17.30 g. J. T. Baker) anhydrous, denatured ethyl alcohol (17.30 g, Pharmco) and TEOS (0.35 g, 99.999+% metals basis, Alfa Aesar) are added to the mill jar.

$Y_2O_3$ powder (99.9999% pure, 5000 nanometer dia. HJD International) and $Al_2O_3$ powder (grade AKP-50, 99.999% pure, 300 nanometer dia., Sumitomo Chemical Company, Ltd.), are dried at 100° C. for 24 hrs and added to the mill jar while still hot from the drying oven to produce a mixture. The powders are employed in a molar ratio of $5:3::Al_2O_3:Y_2O_3$. Total powder weight is 70.00 g.

The mixture of oxidized Menhaden fish oil, xylene, denatured ethyl alcohol, TEOS, $Y_2O_3$ powder and $Al_2O_3$ powder is milled for 24 hrs to produce a first slurry. Polyvinyl butyral (3.49 g, grade B-98, Tape Casting Warehouse), butyl benzyl phthalate (1.75 g, grade S-160, Tape Casting Warehouse) and polyalkylene glycol (1.75 g, grade UCON50HB2000, Tape Casting Warehouse) are added to the first slurry and the resulting treated slurry is milled for an additional 24 hrs to produce a milled slurry. The composition of the milled slurry is shown in Table 1.

TABLE 1

| Slurry Component | Volume % |
|---|---|
| Oxide powders | 23.55 |
| MFO | 2.14 |
| Xylenes | 30.67 |
| Ethyl alcohol | 33.36 |
| PVB | 5.34 |
| Butyl benzyl phthalate | 2.39 |
| Polyalkylene glycol | 2.54 |

The contents of the mill jar are poured through a sieve into a beaker to separate the milling media from the milled slurry. Seven milliliters of a rinse solution formed of equal parts by weight of xylene and ethyl alcohol are used to rinse the media and mill jar to recover residual milled slurry. The recovered residual slurry and rinse solution are added to the milled slurry in the beaker, stirred with a magnetic stir bar at room temperature for 25 minutes, and then cast using a doctor blade that has a gap of 0.3 mm onto a silicone-coated Mylar carrier moving at 38 cm/min to produce a cast tape. The cast tape is dried at room temperature in air for 1 hour to yield a dried tape that has a thickness of 0.1 mm. The dried tape is removed from the carrier and cut into 30 mm×30 mm pieces. Thirty of these pieces are stacked into an assembly that is laminated under a uniaxial pressure of 5 MPa for 15 minutes at 74° C. to yield a preform. The preform then is isostatically compressed at 74° C. at a pressure of 20 MPa for 30 minutes. The preform then is heated in air at 0.5° C./min to 500° C., held at 500° C. for 60 minutes to burn out organics, followed by natural cool-down to yield a green preform. The green preform then is sintered in a vacuum of $10^{-3}$ Torr while heating at 10° C./min to 1800° C., holding at 1800° C. for 16 hrs, and then cooling at 20° C./min to room temperature to produce a 2.7 mm thick transparent YAG product.

Figure 3:
FIG. 3 is a micrograph taken on an environmental scanning electron microscope (ESEM) that shows the microstructure of sintered tape cast YAG processed according to Example 1.

The optical transmission properties of the transparent YAG product are evaluated using a spectrophotometer. The spectrophotometer produces a beam of light that can be continuously varied in wavelength. The change in intensity of the light as a result of passing through the sample is measured. The results are shown in FIG. 1 for the spectral range of 250 to 900 nm and in Table 2. The microstructure of a densified tape cast YAG part is shown in FIG. 3.

TABLE 2

| Wavelength (nm) | Transmittance (%) |
|---|---|
| 300 | 75.06 |
| 350 | 78.90 |
| 400 | 80.12 |
| 450 | 80.58 |
| 500 | 80.93 |
| 550 | 81.15 |
| 600 | 81.27 |
| 650 | 81.20 |
| 700 | 80.29 |
| 750 | 80.51 |
| 800 | 80.61 |
| 850 | 80.66 |
| 900 | 80.66 |

Example 1A

The procedure of example 1 is followed except that cast tape is dried at room temperature in air for 2 hrs.

Example 2

The procedure of Example 1 is followed, except that cyclohexanone (4 drops, Aldrich Chemical Company) is added to the first slurry prior to additional milling to yield the milled slurry.

Example 3

The procedure of Example 1 is followed, except that the yttria powder used is from Nippon Yttria Company (NYC) (99.999% pure, 5,000 nanometer diameter).

Example 4

The procedure of example 1 is followed except that 70 gm of 99.999% pure YAG is substituted for the mixture of yttria and alumna.

Example 5

The procedure of Example 1 is followed except that 5 mm dia. alumina milling media (99.9%, Nikkato Corp., Sakai, Japan) is substituted for the yttria stabilized zirconia milling media and the mill jar is filled to 33% capacity with the alumina milling media.

Example 6

The procedure of Example 1 is followed, except that the doctor blade gap is 0.2 mm.

Example 6A

The procedure of Example 1 is followed, except that the doctor blade gap is 0.5 mm.

Example 7

The procedure of Example 1 is followed except that green preform is heated at 0.1° C./min with a hold at 190° C. for 15 min to burn out the organics.

Example 7A

The procedure of Example 1 is followed except that green preform is heated at 0.1° C./min with a hold at 275° C. for 15 minutes to burn out the organics.

Example 7B

The procedure of Example 1 is followed, except that the green preform is heated 0.1° C./min with a hold at 375° C. for 15 minutes.

Example 7C

The procedure of Example 1 is followed, except that the green preform is heated at 0.1° C./min with a hold at 500° C. for 15 minutes.

Example 7D

The procedure of Example 1 is followed except that green preform is heated at 0.1° C./min with a hold at 190° C. for 45 min to burn out the organics.

Example 7E

The procedure of Example 1 is followed except that green preform is heated at 0.1° C./min with a hold at 275° C. for 45 minutes to burn out the organics.

Example 7F

The procedure of Example 1 is followed, except that the green preform is heated 0.1° C./min with a hold at 375° C. for 45 minutes.

Example 7G

The procedure of Example 1 is followed, except that the green preform is heated at 0.1° C./min with a hold at 500° C. for 45 minutes.

Example 7H

The procedure of Example 1 is followed except that the green preform is heated at 2.0° C./min with a hold at 190° C. for 15 min to burn out the organics.

Example 7I

The procedure of Example 1 is followed except that the green preform is heated at 2.0° C./min with a hold at 275° C. for 15 minutes to burn out the organics.

Example 7J

The procedure of Example 1 is followed, except that the green preform is heated 2.0° C./min with a hold at 375° C. for 15 minutes to burn out organics.

Example 7K

The procedure of Example 1 is followed, except that the green preform is heated at 2.0° C./min with a hold at 500° C. for 15 minutes to burn out organics.

Example 7L

The procedure of Example 1 is followed except that the green preform is heated at 2.0° C./min with a hold at 190° C. for 45 min to burn out the organics.

Example 7M

The procedure of Example 1 is followed except that the green preform is heated at 2.0° C./min with a hold at 275° C. for 45 minutes to burn out the organics.

Example 7N

The procedure of Example 1 is followed, except that the green preform is heated 2.0° C./min with a hold at 375° C. for 45 minutes to burn out organics.

Example 7P

The procedure of Example 1 is followed, except that the green preform is heated at 2.0° C./min with a hold at 500° C. for 45 minutes to burn out organics.

Example 8

The procedure of example 1 is employed except than only uniaxial pressing at 5 MPa at 75° C. is employed to produce the preform.

Example 8A

The procedure of example 1 is employed except than only isostatic pressing at 20 MPa at 75° C. is employed to produce the preform.

Example 9

The procedure of example 1 is followed except that the green preform is held at 1800° C. for 15 min.

Example 9A

The procedure of example 9 is followed except that the green preform is held at 1800° C. for 60 min.

Example 9B

The procedure of example 9 is followed except that the green preform is held at 1800° C. for 24 hrs.

Example 9C

The procedure of example 9 is followed except that the green preform is held at 1800° C. for 48 hrs.

Example 10

The procedure of Example 1 is followed, except that a dopant gradient across the thickness of the product is produced by stacking tape pieces from tapes with different dopant concentrations.

In the present example, a structure formed of an inner section of 10 layers of 0.1 mm thick 1 at. % Nd doped YAG between two outer sections each formed of 10 layers of 0.1 mm thick undoped YAG. Each of the layers of undoped YAG is made according to example 1. Each of the layers of 1 at. % Nd doped YAG is made according to the procedure of example 12 except that 1 atomic % Nd based on the yttrium content of the $Y_2O_3$ powder is substituted for Er where Nd is provided in the form of $Nd_2O_3$ (Aldrich, 100 nm, 99.9%). The layers then are assembled into a stack, compressed uniaxially at 5 MPa and 74° C. and subsequently laminated isostatically at 20 MPa and 74° C. to produce a preform. The preform then is heated to burn out organics as in example 1 and also sintered according to the procedure of example 1.

Example 10A

In this example, 8 layers of 0.1 mm thick undoped YAG is assembled with 2 layers of 0.1 mm thick 0.25 at % Nd doped YAG, two layers of 0.1 mm thick 0.5 at % Nd doped YAG, two layers of 0.1 mm thick 0.75 at % Nd doped YAG, two layers of 0.1 mm thick 1at % Nd doped YAG, two layers of 0.1 mm thick 0.75 at % Nd doped YAG, two layers of 0.1 mm thick 0.5 at % Nd doped YAG, two layers of 0.1 mm thick 0.25% Nd doped YAG and 8 layers of 0.1 mm thick YAG into a stack. Each of the undoped YAG layers is made according to example 1.

Each of the 0.25 at % Nd doped YAG layers is made by according to the procedure of example 12 except that 0.25 atomic % Nd based on the yttrium content of the $Y_2O_3$ powder is substituted for Er where Nd is provided in the form of $Nd_2O_3$ (Aldrich, 100 nm, 99.9%). Each of the 0.5 at % Nd doped YAG layers is made by according to the procedure of example 12 except that 0.5 atomic % Nd based on the yttrium content of the $Y_2O_3$ powder is substituted for Er where Nd is provided in the form of $Nd_2O_3$ (Aldrich, 100 nm, 99.9%). Each of the 0.75 at % Nd doped YAG layers is made according to the procedure of example 12 except that 0.75 atomic % Nd based on the yttrium content of the $Y_2O_3$ powder is substituted for Er where Nd is provided in the form of $Nd_2O_3$ (Aldrich, 100 nm, 99.9%). The stack then is laminated and heat treated according to the procedure of example 10.

Example 10B

The procedure of Example 1 is followed, except that a dopant gradient across the thickness of the product is produced by stacking tape pieces from tapes with different dopant concentrations.

Figure 6A:
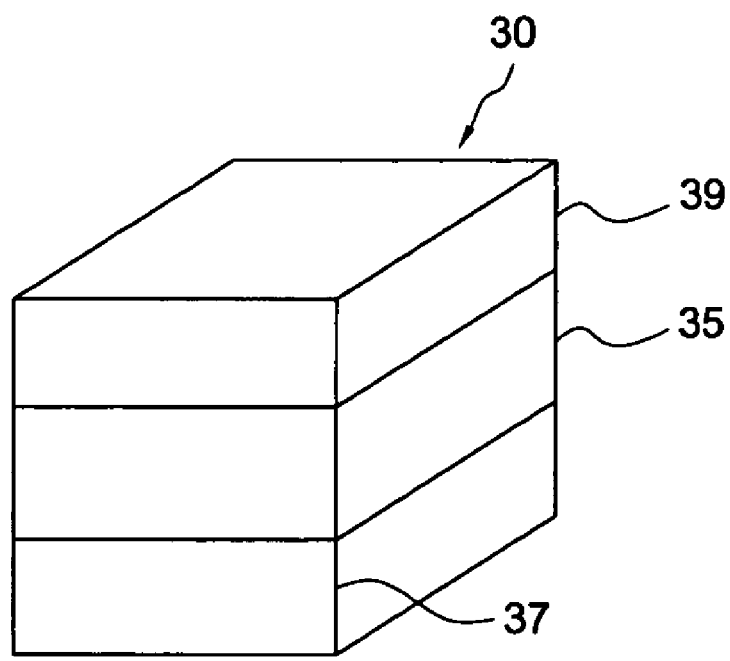
FIG. 6 (a) is a perspective view of stacked, tape cast parts made according to example 10B.

In the present example, a structure 30 as shown in FIG. 6(a) formed of middle section 35 of 10 layers of 0.1 mm thick 0.25 at % Er doped YAG between a bottom section 37 formed of 10 layers of undoped YAG and a top section 39 formed of 10 layers of 0.5 at % doped YAG. Each of the layers of undoped YAG is made according to example 1. Each of the layers of 0.5 at % Er doped YAG is made according to the procedure of example 12. Each of the 0.25 at % Er doped YAG layers are made according to example 12 except that 0.25 atomic % Er based on the yttrium content of the $Y_2O_3$ powder is employed. The layers then are assembled into a stack, compressed uniaxially at 5 MPa and 74° C. and subsequently laminated isostatically at 20 MPa and 74° C. to produce a preform. The preform then is heated to burn out organics as in example 1 and also sintered according to the procedure of example 1.

Example 11

Figure 4:
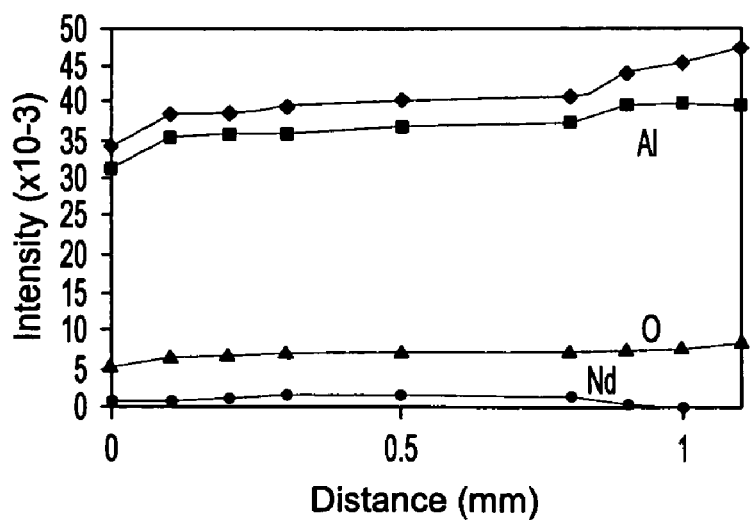
FIG. 4 shows line scans taken with energy-dispersive x-ray spectroscopy (EDS) across the thickness of an $Nd^{3+}$ doped, transparent YAG product produced according to Example 11 where the concentration of $Nd^{3+}$ dopant varies across the thickness of the YAG product.
Figure 4:
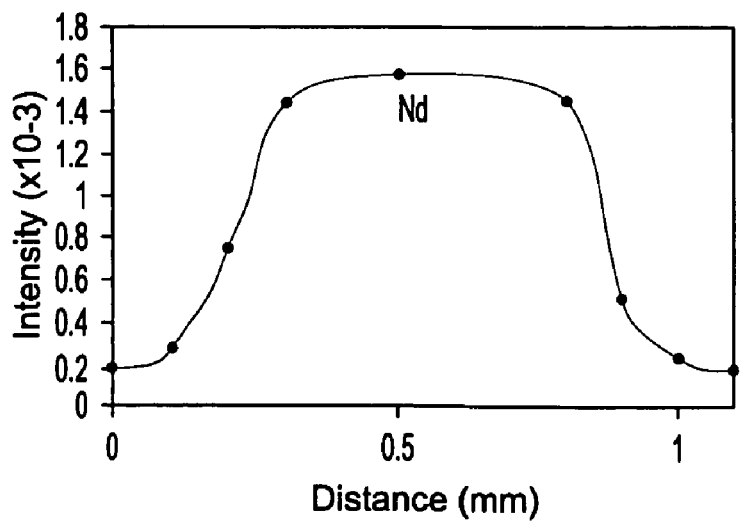

A transparent YAG product formed of a 0.4 mm thick layer of 4 at % $Nd^{3+}$ doped YAG sandwiched between layers of pure YAG is produced. The YAG product has a thickness of 4 mm. In this procedure, a stack formed of a 1.8 mm thick layer of YAG, a 0.4 mm thick layer of 4 at % $Nd^{3+}$ doped YAG, and a 1.8 mm thick layer of undoped YAG produced according to example 1 are assembled into a stack. The undoped YAG layer is made according to example 1. The 4 at % $Nd^{3+}$ doped YAG layer is made by according to the procedure of example 12 except that 4.0 atomic % Nd based on the yttrium content of the $Y_2O_3$ powder is substituted for Er where Nd is provided in the form of $Nd_2O_3$ (Aldrich, 100 nm, 99.9%). The stack is laminated and heat treated according to the procedure of example 10. Line scans across the thickness of the Nd doped YAG products are taken by energy-dispersive x-ray spectroscopy (EDS). The results are shown in FIG. 4 and Table 3. The graph on the left in FIG. 4 represents results of scans for Y, Al, O and Nd. The graph on the right in FIG. 4 represents a scan for Nd.

TABLE 3

| | Element: | | | |
|---|---|---|---|---|
| Distance | Y | Al | O | Nd |
| | | Intensity | | |
| 0 (mm) | 34,134 | 31,118 | 5,480 | 182 |
| 0.1 | 38,658 | 35,496 | 6,475 | 278 |
| 0.2 | 38,807 | 35,814 | 6,706 | 745 |
| 0.3 | 39,650 | 35,877 | 7,177 | 1,438 |
| 0.5 | 40,575 | 37,008 | 7,490 | 1,582 |
| 0.8 | 41,273 | 37,589 | 7,670 | 1,464 |
| 0.9 | 44,393 | 39,946 | 7,980 | 531 |
| 1.0 | 45,927 | 40,299 | 7,917 | 253 |
| 1.1 | 47,551 | 39,984 | 9,088 | 196 |

Example 12

The procedure of example 1 except that 0.5 atomic % Er in the form of $Er(NO_3)_3 \cdot 5H_2O$ (Alfa Aesar, 99.99%) based on the yttrium content of the $Y_2O_3$ powder is added as a dopant when adding the powders to the slurry.

Example 13

Figure 5:
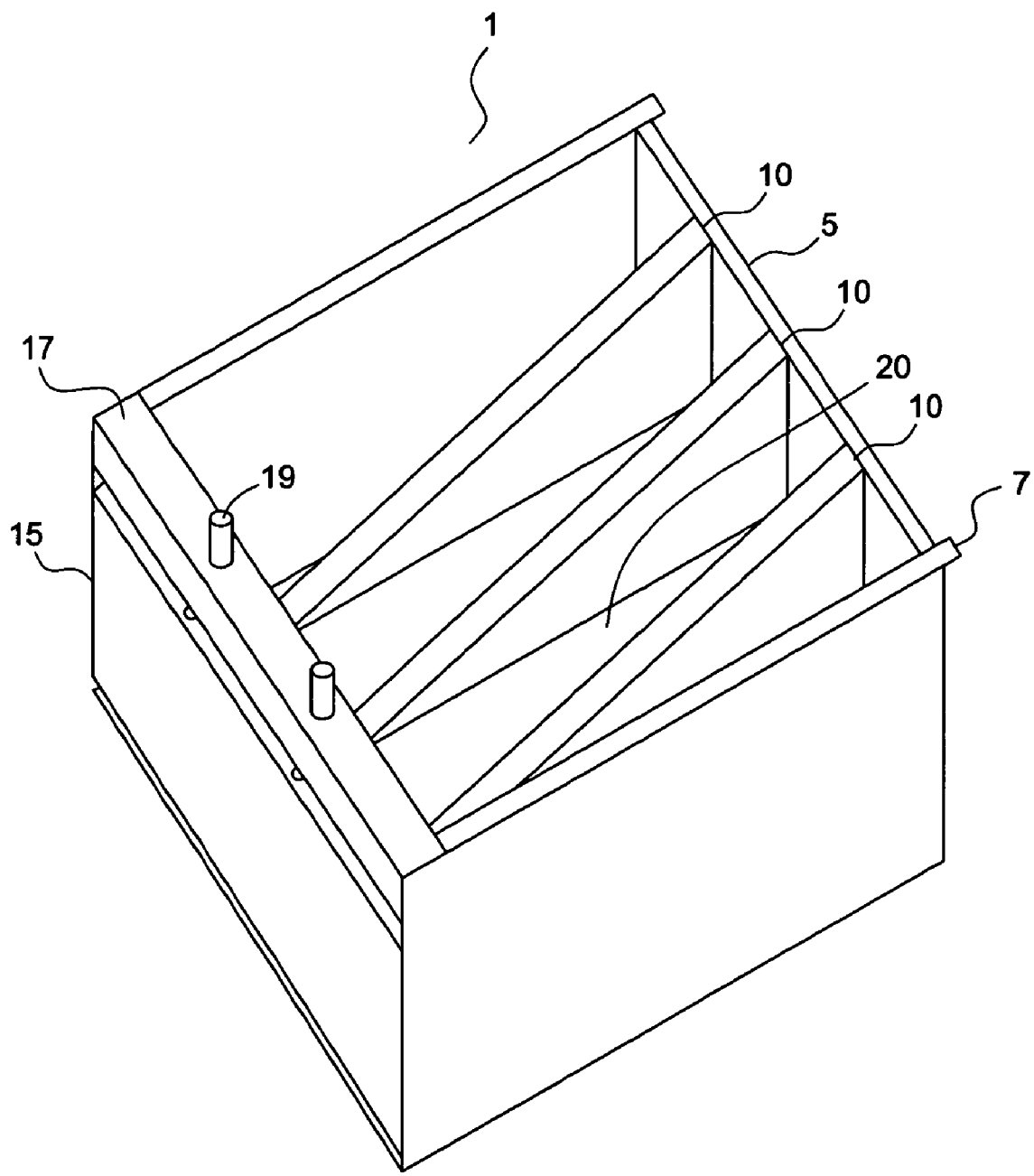
FIG. 5 is a schematic of an apparatus used to co-cast slurries to make a composite tape such as a segmented composite tape.

The milled slurry of example 1 is placed into a first reservoir of the apparatus of FIG. 5. The milled slurry of example 1, with 1at % Nd as a dopant is placed into a second reservoir of the apparatus of FIG. 5. The milled slurry of example 1 is placed into a third reservoir of the apparatus of FIG. 5. The slurries are cast simultaneously at a doctor blade gap of 0.35 mm onto the carrier employed in example 1 at the rate of 20 cm/min to produce a segmented, co-cast tape. The segmented tape is dried at 25° C. to produce a dried tape. The dried tape is cut into pieces that measure 25 mm×25 mm. Fifty of these pieces are stacked where each of the segments of the tape is in registry with each other to produce an assembly. The assembly is compressed uniaxially at 5 MPa and 74° C. to produce a preform. The preform then is isostatically compressed at 20 MPa and 74° C. The resulting preform then is heated to burn out organics following the procedure in example 1, fired at 1700° C. for 4 hr in a vacuum of $10^{-3}$ Torr. The resulting product is isostatically hot pressed at 1700° C. at 200 MPa Ar pressure for 8 hr to produce a segmented composite part.

Example 13A

Figure 6B:
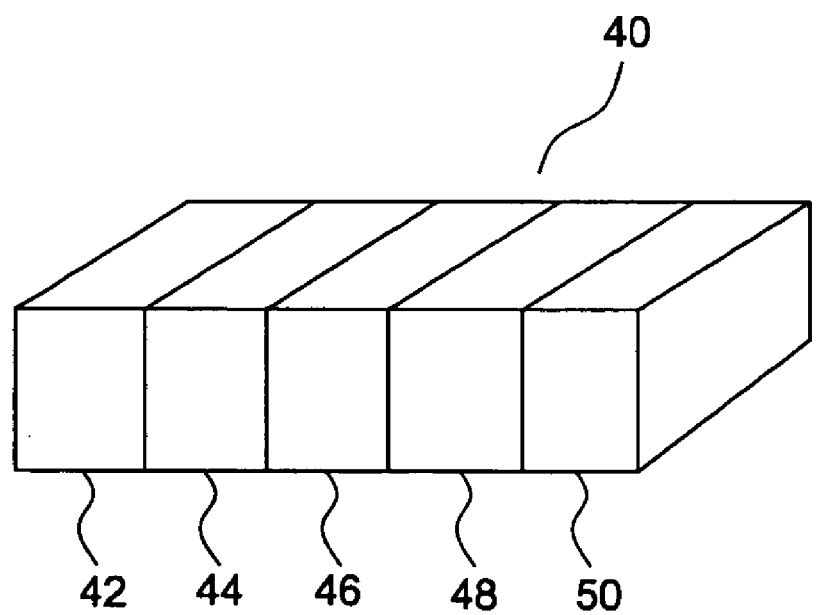

The apparatus of FIG. 5 is employed except that the device uses four dividers 10 to provide five reservoirs. The milled slurry of example 1 is placed into a first and a fifth reservoir. The milled slurry of example 12, with 0.5% Er as a dopant is placed into a third reservoir within the apparatus of FIG. 5. The milled slurry of example 12 where 0.25% Er is substituted for 0.5% Er is placed into a second and fourth reservoir of the apparatus of FIG. 5. The slurries are cast simultaneously at a doctor blade gap of 0.35 mm onto the carrier employed in example 1 at the rate of 20 cm/min to produce a segmented, co-cast tape 40 as shown in FIG. 6(*a*). The segmented tape is dried at 25° C. to produce a dried tape having segments 42, 44, 46, 48 and 50 where segments 42 and 50 are undoped YAG, segment 46 is 0.5 at % Er doped YAG and segments 44 and 48 are 0.25 at % doped YAG.

The dried tape is cut into rectangular pieces measuring 30 mm×130 mm. Fifty of these pieces are stacked with the interfaces registered to produce an assembly. The assembly is compressed uniaxially at 5 MPa and 74° C. to produce a preform. The preform then is isostatically compressed at 20 MPa and 74° C. The resulting preform then is heated to burn out organics following the procedure in example 1, fired at 1700° C. for 4 hr in a vacuum of $10^{-3}$ Torr. The resulting product is isostatically hot pressed at 1700° C. at 200 MPa Ar pressure for 8 hr to produce a segmented composite part.

Example 14

The procedure of example 1 is followed except the sintered YAG preform produced in example 1 is hot isostatically pressed at 1750° C. at 200 MPa Ar pressure for 4 hr.

In an alternative embodiment, an aqueous slurry may be used. Useful aqueous slurries include YAG powder, succinic acid (dispersant), polyethyleneimine (PEI, dispersant/binder) and water. This embodiment is illustrated in Example 15.

Example 15

The procedure of example 1 is followed except that an aqueous-based slurry is formulated.

In this embodiment, 14 g of water is substituted for ethyl alcohol and xylene, 5 g of succinic acid (ACS reagent grade, ≧99.0%) and 14 g of PEI (Aldrich, 80% ethoxylated solution average $M_w$~50,000, 37 wt % in $H_2O$) are substituted for the organics (i.e. the dispersant, binder and plasticizers), and the solids include 70 g of YAG powder.

Example 16

Manufacture of Transparent $Ce_2O_3$

A 250 ml high density polyethylene mill jar is filled to 33.3% vol capacity with 5 mm diameter alumina milling media. Oxidized Menhaden fish oil (1.40 g, grade Z-3, Tape Casting Warehouse), xylene (17.30 g. J. T. Baker) anhydrous, denatured ethyl alcohol (17.30 g, Pharmco) and TEOS (0.35 g, 99.999+% metals basis, Alfa Aesar) are added to the mill jar. $Ce_2O_3$ powder (99.9999% pure, 5000 nanometer dia. from Alfa Aesar) and is dried at 100° C. for 24 hrs and added to the mill jar while still hot from the drying oven to produce a mixture. Total powder weight is 70.00 g.

The mixture of oxidized Menhaden fish oil, xylene, denatured ethyl alcohol, TEOS and $Ce_2O_3$ powder to produce a first slurry. Polyvinyl butyral (3.49 g, grade B-98, Tape Casting Warehouse), butyl benzyl phthalate (1.75 g, grade S-160, Tape Casting Warehouse) and polyalkylene glycol (1.75 g, grade UCON50HB2000, Tape Casting Warehouse) are added to the first slurry to produce a treated slurry that then is milled for an additional 24 hrs to produce a milled slurry.

The contents of the mill jar are poured through a sieve into a beaker to separate the milling media from the milled slurry. Ten milliliters of a rinse solution formed of equal parts by weight of xylene and ethyl alcohol are used to rinse the media and mill jar to recover residual milled slurry. The recovered residual slurry and rinse solution are added to the milled slurry in the beaker, stirred with a magnetic stir bar at room temperature for 25 minutes, and then cast using a doctor blade that has a gap of 0.3 mm onto a silicone-coated Mylar carrier moving at 20 cm/min to produce a cast tape.

The cast tape is dried at room temperature in air for 1 hour to yield a dried tape that has a thickness of 0.1 mm. The dried tape is removed from the carrier and cut into 30 mm×30 mm pieces. Thirty of these pieces are stacked into an assembly that is laminated under a uniaxial pressure of 5 MPa for 15 minutes at 74° C. to yield a preform. The preform then is isostatically compressed at 74° C. at a pressure of 20 MPa for 30 minutes. The preform then is heated in air at 0.5° C./min to 500° C., held at 500° C. for 60 minutes to burn out organics, followed by natural cool-down to yield a green preform. The green preform then is sintered in a vacuum of $10^{-3}$ Torr while heating at 10° C./min to 1750° C., holding at 1800° C. for 8 hrs, and then cooling at 20° C./min to room temperature.

Example 17

Manufacture of Transparent $Y_2O_3$

The procedure of example 16 is followed except that $Y_2O_3$ is substituted for $Ce_2O_3$. The green preform then is sintered in a vacuum of $10^{-3}$ Torr while heating at 10° C./min to 1900° C., holding at 1900° C. for 6 hrs, and then cooling at 20° C./min to room temperature.

Example 18

Manufacture of Transparent $Sc_2O_3$

The procedure of example 16 is followed except that $Sc_2O_3$ is substituted for $Ce_2O_3$. The green preform then is sintered in a vacuum of $10^{-4}$ Torr while heating at 10° C./min to 1800° C., holding at 1800° C. for 10 hrs, and then cooling at 20° C./min to room temperature.

Example 19

Manufacture of Transparent $Lu_2O_3$

The procedure of example 16 is followed except that $Lu_2O_3$ is substituted for $Ce_2O_3$. The green preform then is sintered in a vacuum of $10^{-3}$ Torr while heating at 10° C./min to 1850° C., holding at 1850° C. for 8 hrs, and then cooling at 20° C./min to room temperature.

Example 21

Manufacture of Transparent $MgAl_2O_4$ Spinel

A 250 ml high density polyethylene mill jar is filled to 33.3% vol capacity with 5 mm diameter alumina milling media. Oxidized Menhaden fish oil (1.40 g, grade Z-3, Tape Casting Warehouse), xylene (17.30 g. J. T. Baker) anhydrous, denatured ethyl alcohol (17.30 g, Pharmco) and TEOS (0.35 g, 99.999+% metals basis, Alfa Aesar) are added to the mill jar. MgO powder (99.9999% pure, 5000 nanometer dia. from Sigma-Aldrich) and $Al_2O_3$ powder (grade AKP-50, 99.999% pure, 300 nanometer dia., Sumitomo Chemical Company, Ltd.), are dried at 100° C. for 24 hrs and added to the mill jar while still hot from the drying oven to produce a mixture. The powders are employed in a molar ratio of 1:1::$Al_2O_3$:MgO. Total powder weight is 70.00 g.

The mixture of oxidized Menhaden fish oil, xylene, denatured ethyl alcohol, TEOS, MgO powder and $Al_2O_3$ powder is milled for 24 hrs to produce a first slurry. Polyvinyl butyral (3.49 g, grade B-98, Tape Casting Warehouse), butyl benzyl phthalate (1.75 g, grade S-160, Tape Casting Warehouse) and polyalkylene glycol (1.75 g, grade UCON50HB2000, Tape Casting Warehouse) are added to the first slurry to produce a treated slurry that then is milled for an additional 24 hrs to produce a milled slurry.

The contents of the mill jar are poured through a sieve into a beaker to separate the milling media from the milled slurry. Ten milliliters of a rinse solution formed of equal parts by weight of xylene and ethyl alcohol are used to rinse the media and mill jar to recover residual milled slurry. The recovered residual slurry and rinse solution are added to the milled slurry in the beaker, stirred with a magnetic stir bar at room temperature for 25 minutes, and then cast using a doctor blade that has a gap of 0.3 mm onto a silicone-coated Mylar carrier moving at 20 cm/min to produce a cast tape.

The cast tape is dried at room temperature in air for 1 hour to yield a dried tape that has a thickness of 0.1 mm. The dried tape is removed from the carrier and cut into 30 mm×30 mm pieces. Thirty of these pieces are stacked into an assembly that is laminated under a uniaxial pressure of 5 MPa for 15 minutes at 74° C. to yield a preform. The preform then is isostatically compressed at 74° C. at a pressure of 20 MPa for 30 minutes. The preform then is heated in air at 0.4° C./min to 600° C., held at 600° C. for 30 minutes to burn out organics, followed by natural cool-down to yield a green preform. The green preform then is sintered in a vacuum of $10^{-3}$ Torr while heating at 10° C./min to 1700° C., holding at 1700° C. for 5 hrs, and then cooling at 20° C./min to room temperature.

Example 22

The procedure of Example 1 is followed except that 0.3 g $B_2O_3$ (99.98%, metals basis, Alfa Aesar) is substituted for TEOS.

The invention claimed is:

1. A method of manufacture of transparent yttrium aluminum garnet comprising,
   forming a mixture of $Y_2O_3$, $Al_2O_3$, sintering aid, dispersant and organic solvent,
   milling the mixture to produce a first slurry,
   mixing the first slurry with an organic binder and a plasticizer to form a treated slurry,
   milling the treated slurry to produce milled slurry,
   tape casting the milled slurry to produce cast tape,
   drying the cast tape to produce dried tape,
   stacking portions of dried tape to form an assembly,
   compressing the assembly to produce a preform,
   heating the preform to produce a green preform, and
   sintering the green preform to produce transparent yttrium aluminum garnet.

2. The method of claim 1 wherein the sintering aid is selected from the group consisting of tetraethoxysilane, colloidal silica, lithium oxide, titanium oxide, zirconium oxide, barium oxide, calcium oxide, magnesium oxide, strontium oxide, boron oxide and mixtures thereof.

3. The method of claim 2 wherein the dispersant is selected from the group consisting of oxidized Menhaden fish oil, succinic acid, ethanedioic acid, propanedioic acid, pentanedioic acid, hexanedioic acid, heptanedioic acid, octanedioic acid, nonanedioic acid, decanedioic acid, o-phthalic acid, p-phthalic acid, sorbitan monooleate and mixtures thereof.

4. The method of claim 3 wherein the organic binder is selected from the group consisting of polyvinyl butyral, polyvinyl alcohol, polyvinyl chloride, polyvinyl acetate, polyacrylonitrile, polyethyleneimine, poly methyl methacrylate, vinyl chloride-acetate and mixtures thereof.

5. The method of claim 4 wherein the plasticizer is selected from the group consisting of butyl benzyl phthalate, bis(2-ethylhexyl) phthalate, diisononyl phthalate, bis(n-butyl)phthalate, butyl benzyl phthalate, diisodecyl phthalate, di-n-octyl phthalate, diisooctyl phthalate, diethyl phthalate, diisobutyl phthalate, di-n-hexyl phthalate, bis(2-ethylhexyl) adipate, dimethyl adipate, monomethyl adipate, dioctyl adipate, dibutyl sebacate, dibutyl maleate, polyethylene glycol, polypropylene glycol, N-ethyl toluene sulfonamide, N-(2-hydroxypropyl)benzene sulfonamide, N-(n-butyl)benzene sulfonamide, tricresyl phosphate, tributyl phosphate, triethylene glycol dihexanoate, tetraethylene glycol diheptanoate, triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trimethyl citrate, alkyl sulphonic acid phenyl ester and mixtures thereof.

6. The method of claim 2 wherein the organic solvent is selected from the group consisting of denatured ethanol, methanol, isopropyl alcohol and xylenes, cyclohexanone, acetone, toluene, methyl ethyl ketone and mixtures thereof.

7. The method of claim 2 wherein the compressing is at a pressure of about 5 MPa to about 30 MPa.

8. The method of claim 2 wherein the sintering is performed at about 1600° C. to about 1900° C.

9. The method of claim 1 wherein the sintering aid is about 0.01 wt. % to about 5 wt. % based on total weight of $Y_2O_3$ and $Al_2O_3$.

10. The method of claim 1 wherein the mixture further comprises a rare earth dopant selected from the group consisting of $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$ $Er^{3+}$, $Tm^{3+}$ $Yb^{3+}$, $Lu^{3+}$ and mixtures thereof.

11. The method of claim 1 wherein the mixture further comprises a rare earth dopant selected from the group consisting of $Nd^{3+}$, $Er^{3+}$ and mixtures thereof.

12. The method of claim 11 wherein the sintering aid is tetraethoxysilane, the dispersant is oxidized Menhaden fish oil, the organic binder is polyvinyl butyral, the plasticizer is butyl benzyl phthalate, the organic solvent includes denatured ethanol and xylenes and the sintering is performed in a vacuum.

13. A method of forming transparent ceramic oxide materials comprising
   forming a mixture of ceramic oxide, dispersant and organic solvent,
   milling the mixture to produce a first slurry,
   mixing the first slurry with an organic binder and a plasticizer to form a treated slurry,
   milling the treated slurry to produce milled slurry,
   tape casting the milled slurry to produce cast tape,
   drying the cast tape to produce dried tape,
   stacking portions of dried tape to form an assembly,
   compressing the assembly to produce a preform,
   heating the preform to produce a green preform, and
   sintering the green preform to produce transparent ceramic oxide.

14. The method of claim 13 wherein the ceramic oxide is selected from the group consisting of Al2O3, indium oxide, thallium oxide, silicon aluminum oxi-nitride, yttrium aluminum garnet, cerium oxide, yttrium oxide, scandium oxide, lutetium oxide, magnesium aluminum spinel, zirconium oxide and mixtures thereof.

15. A method of forming a transparent ceramic segmented tape comprising,
   forming a plurality of milled slurries of differing compositions wherein at least one of the milled slurries is made by forming a mixture of ceramic oxides, dispersant and solvent,
   milling the mixture to form a first slurry,
   mixing the first slurry with a binder and a plasticizer to form a treated slurry,
   milling the treated slurry to form a milled slurry,
   depositing the milled slurries into adjacent reservoirs within a doctor blade device suitable for simultaneously casting each of the milled slurries onto a carrier to form a plurality of tape cast segments having contiguous interfaces between the segments to produce a segmented cast tape,
   drying the cast tape to produce dried tape,
   stacking portions of dried tape to form an assembly,
   compressing the assembly to produce a preform,
   heating the preform to produce a green preform, and
   sintering the green preform to produce transparent ceramic segmented tape.

16. The method of claim 15 wherein at least one of the milled slurries includes a mixture of $Y_2O_3$ and $Al_2O_3$.

17. The method of claim 15 wherein at least one of the milled slurries includes a mixture of $Y_2O_3$, $Al_2O_3$ and a dopant.

18. A method of forming a transparent ceramic product having a dopant gradient across a portion of the thickness of the product comprising,
   forming a plurality of milled slurries of differing compositions wherein at least one of the milled slurries is made by forming a mixture of ceramic oxide, dopant, dispersant and solvent,
   milling the mixtures to form a plurality of first slurries,
   mixing at least one of the first slurries with a binder and a plasticizer to form treated slurries,
   milling the treated slurries to form milled slurries,
   tape casting the milled slurries to produce a plurality of cast tapes of differing compositions,
   drying the cast tapes to produce dried tapes of differing compositions,
   stacking portions of the dried tapes to form thicknesses of a plurality of assemblies of the dried tapes,
   compressing the assemblies to produce a preform,
   heating the preform to produce a green preform, and
   sintering the green preform to produce a transparent ceramic product having a thickness and a dopant gradient across a portion of the thickness of the ceramic product.

19. The method of claim 18 wherein at the dopant is rare earth dopant is selected from the group consisting of $Nd^{3+}$, $Er^{3+}$ and mixtures thereof.

* * * * *

UNITED STATES PATENT AND TRADEMARK OFFICE
CERTIFICATE OF CORRECTION

| | | Page 1 of 1 |
|---|---|---|
| PATENT NO. | : 7,799,267 B2 | |
| APPLICATION NO. | : 12/283610 | |
| DATED | : September 21, 2010 | |
| INVENTOR(S) | : Messing et al. | |

It is certified that error appears in the above-identified patent and that said Letters Patent is hereby corrected as shown below:

In the Specification

In Col. 1, line 3 before "REFERENCE TO RELATED APPLICATIONS", insert --This invention was made with government support under Contract No. FA9451-05-C-0182, awarded by the Air Force Research Laboratory at Kirkland Air Force Base. The Government has certain rights in the invention. The Air Force Research Laboratory is the prime contractor for a sub-award between II-VI, Inc. and The Pennsylvania State University.--

Signed and Sealed this
Twenty-third Day of September, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 7,799,267 B2 | Page 1 of 1 |
| APPLICATION NO. | : 12/283610 | |
| DATED | : September 21, 2010 | |
| INVENTOR(S) | : Messing et al. | |

It is certified that error appears in the above-identified patent and that said Letters Patent is hereby corrected as shown below:

In the Specification

In Col. 1, line 3 before "REFERENCE TO RELATED APPLICATIONS", insert --This invention was made with government support under Contract Nos. FA9451-05-C-0182 and FA9451-06-D-0012, DO#0001 awarded by the United States Air Force. The Government has certain rights in the invention.--

This certificate supersedes the Certificate of Correction issued September 23, 2014.

Signed and Sealed this
Sixteenth Day of December, 2014

Michelle K. Lee
*Deputy Director of the United States Patent and Trademark Office*